US012749509B2

(12) United States Patent
Vijayaraghavan

(10) Patent No.: US 12,749,509 B2
(45) Date of Patent: Sep. 29, 2026

(54) COMPUTER SYSTEM FOR GENERATING EFFECT-LOADED VIDEOS

(71) Applicant: Lemon Inc., Grand Cayman (KY)

(72) Inventor: Lakshminarayanan Vijayaraghavan, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 146 days.

(21) Appl. No.: 18/743,845

(22) Filed: Jun. 14, 2024

(65) Prior Publication Data

US 2025/0384900 A1 Dec. 18, 2025

(51) Int. Cl.
*G11B 27/036* (2006.01)

(52) U.S. Cl.
CPC .................................. *G11B 27/036* (2013.01)

(58) Field of Classification Search
CPC .................................................... G11B 27/036
See application file for complete search history.

(56) References Cited

U.S. PATENT DOCUMENTS

2017/0098255 A1* 4/2017 Miller ..................... G06F 16/71
2018/0097866 A1* 4/2018 Pique Corchs .. H04N 21/47205

* cited by examiner

*Primary Examiner* — Mishawn N. Hunter
(74) *Attorney, Agent, or Firm* — Alleman Hall LLP

(57) ABSTRACT

Implementations for a content review system for effect-loaded videos are provided. One aspect includes a computer system for generating effect-loaded videos, the computer system comprising processing circuitry and memory storing instructions that, when executed, causes the processing circuitry to: receive an effect package comprising metadata relating to a set of effects capable of being applied to a video file; identify a set of algorithms relating to the set of effects based on the metadata of the effect package; select a set of template videos based on the set of algorithms; generate a set of effect-loaded videos by applying the set of effects to the set of template videos; and output the set of effect-loaded videos.

20 Claims, 8 Drawing Sheets

COMPUTER SYSTEM FOR GENERATING EFFECT-LOADED VIDEOS

BACKGROUND

User-generated content on various social media platforms is often reviewed in order to exclude content that violates the rules of said social media platforms. For example, content can be reviewed upon submission of the content from the user prior to publication of the content. In another example, published content can be flagged by the community for review.

SUMMARY

Implementations for a computer system for generating effect-loaded videos are provided. In one aspect, the computer system comprises processing circuitry and memory storing instructions that, when executed, cause the processing circuitry to: receive an effect package comprising metadata relating to a set of effects capable of being applied to a video file; identify a set of algorithms relating to the set of effects based on the metadata of the effect package; select a set of template videos based on the set of algorithms; generate a set of effect-loaded videos by applying the set of effects to the set of template videos; and output the set of effect-loaded videos.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
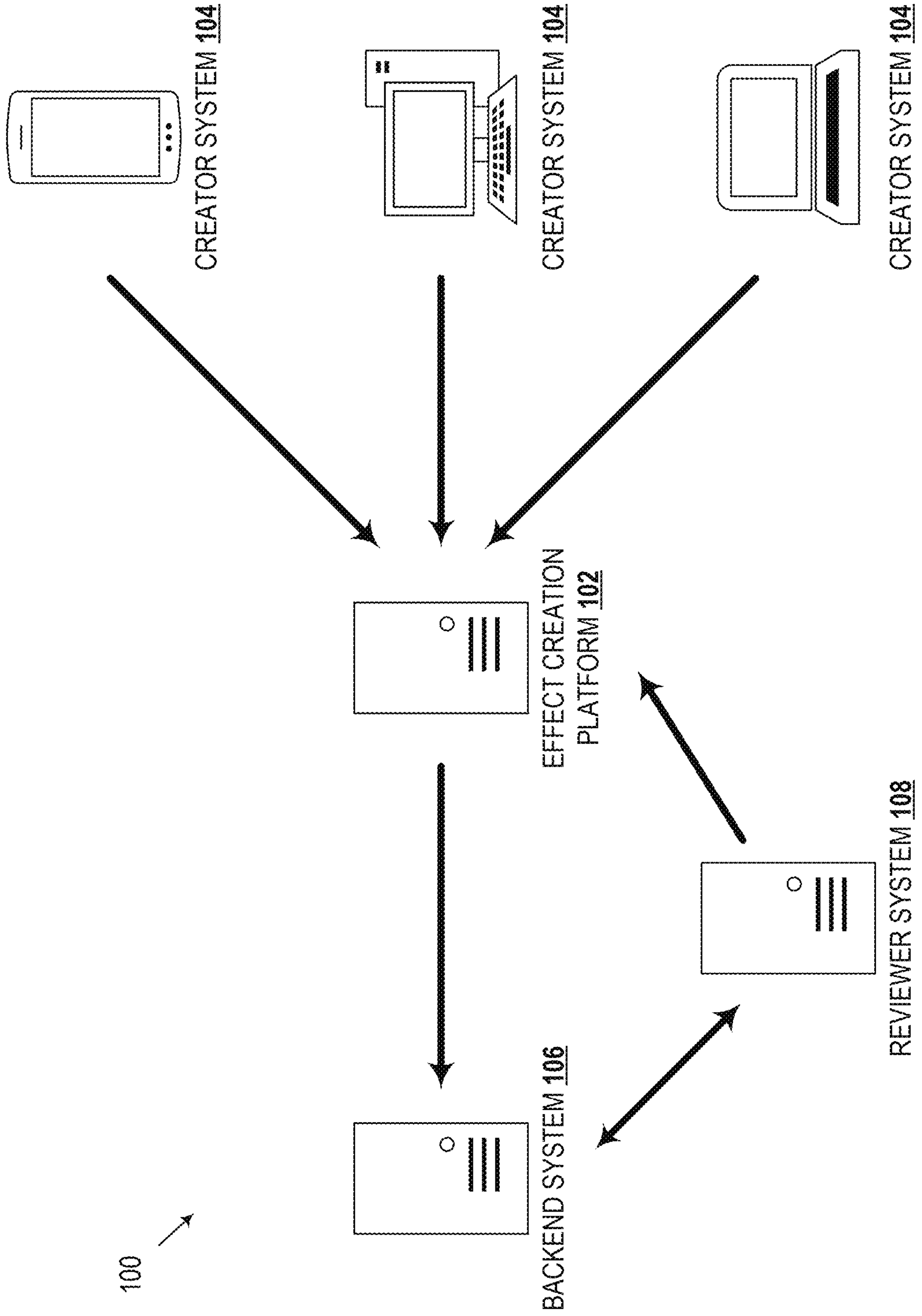
FIG. 1 shows an example system for implementing a review pipeline for user-created effects.

Review of user-published material is an important aspect for the operation of a social media platform. Various forms of content can be reviewed in various ways. One example includes social media platforms that provide an effect creation platform for users to create effects that can be applied to videos for publishing on the related social media platform. Effects as described herein include various augmentations that can be applied to a video, including filters, digital object placements and interactions, and various other augmented reality effects. These effects may be published on the effect creation platform and/or social media platform for other users to utilize and to apply to their own videos. In such cases, the effects may need to go through a review process before publishing to public users to ensure that they comply with the rules of the social media platform.

Generally, the review process involves human reviewers. With traditional content review, such as review of content in its published form, review is straightforward and typically involves visual inspection of the published form by a human reviewer. However, review of user-created effects present novel challenges as it demands efficient and effective review mechanisms. Review of effects can be difficult as the visualization of the effects depends on the content of the video to which they are applied. For example, an effect that places a digital hat onto a person's head in a video can involve machine vision applications that identify and track a human head. Application of the effect to a video can result in no visual differences if there is no detected/tracked human head. Current methodologies of moderating user-created effects generally involve human reviewers manually applying the effects to standard template videos selected by the human reviewers based on their interpretation of the effect, description provided by the creator, etc. However, technical errors and misinterpretations introduced by human error pose significant challenges. For example, effects with poor descriptions can present difficulties in finding an appropriate template video that showcases the effects. As a result, such moderation methodologies can be unreliable and often result in false rejections due to a lack of apparent visual effects, causing delays in moderation timelines and hindering overall process efficiency.

In view of the observations above, implementations for automating the creation of effect-loaded videos for review processes are provided. Automating the creation of effect-loaded videos can be performed in various ways. In some implementations, a review system is implemented to include an automated service application that can autonomously collect effects created and submitted by users on an effect creation platform. Once collected, algorithms employed in the effects are identified, and one or more appropriate template videos are selected to accurately display the effects for a human reviewer to review. In further implementations, the process includes simulating user input actions, such as touch screen gestures, which can further enhance the accuracy of an effect's replication.

Processing of the template videos to load the effects and/or input actions can be performed in various ways. In some implementations, the videos are processed using the same effect creation platform on which the effects are created. For example, the service application can utilize the capabilities of an effect creation platform to load effects onto the selected template video(s). As the effects are created on the same platform, replication of such effects can be performed accurately. The effect-loaded videos can be outputted for content moderation (e.g., forwarded to a content moderation team). This offers a technical advantage of providing higher-quality replication of effects in their native environment while automating moderation tasks up to the final review process. This enhances efficiency, mitigates potential technical errors, and provides a consistent, reliable evaluation methodology.

Turning now to the figures, content moderation systems for automating the creation of effect-loaded videos are described in further detail. FIG. 1 shows an example system 100 for implementing a content moderation pipeline for user-created effects. The systems and devices described herein can be implemented in various ways, including through the use of computing devices, servers, etc. The example system 100 includes an effect creation platform 102 from which users operating creator systems 104 can access a frontend application interface that provides various features for the creation of effects that can be applied to videos. In some implementations, the effect creation platform 102 is implemented on a plurality of devices or virtual machines running instances of the application. The creator system 104 can include any type of computing device for accessing the effect creation platform 102, including mobile phone devices, laptop devices, desktop devices, etc.

The creator system 104 can create an effect using the effect creation platform 102, which is then transmitted to a backend system 106 to await moderation. The transmitted effect can be formatted in various ways. In some implementations, the transmitted effect is formatted as an effect package that includes metadata relating to the effect. The backend system 106 can be implemented to provide a database of effects, including reviewed effects and effects waiting for review. Once there is a submitted user-created effect awaiting moderation, a reviewer system 108 can be configured to retrieve information relating to the submitted user-created effect. In some implementations, the retrieved information includes effect package data that contains metadata relating to the associated effect. The retrieved information can be utilized to process a video with the associated effect applied to said video to generate an effect-loaded video. For example, the retrieved information can be used by an instance of the effect creation platform 102 to determine and to apply an effect onto a video. In some implementations, the video is a template video pre-loaded on the effect creation platform 102. In the example of FIG. 1, the reviewer system 108 utilizes an instance of the effect creation platform 102 to load the user-created effect onto a set of template videos to generate a set of effect-loaded videos that can be outputted for review. Processes for generating effect-loaded videos using the retrieved information associated with a user-created effect are described in further detail in FIG. 4 and its accompanying descriptions.

Figure 2:
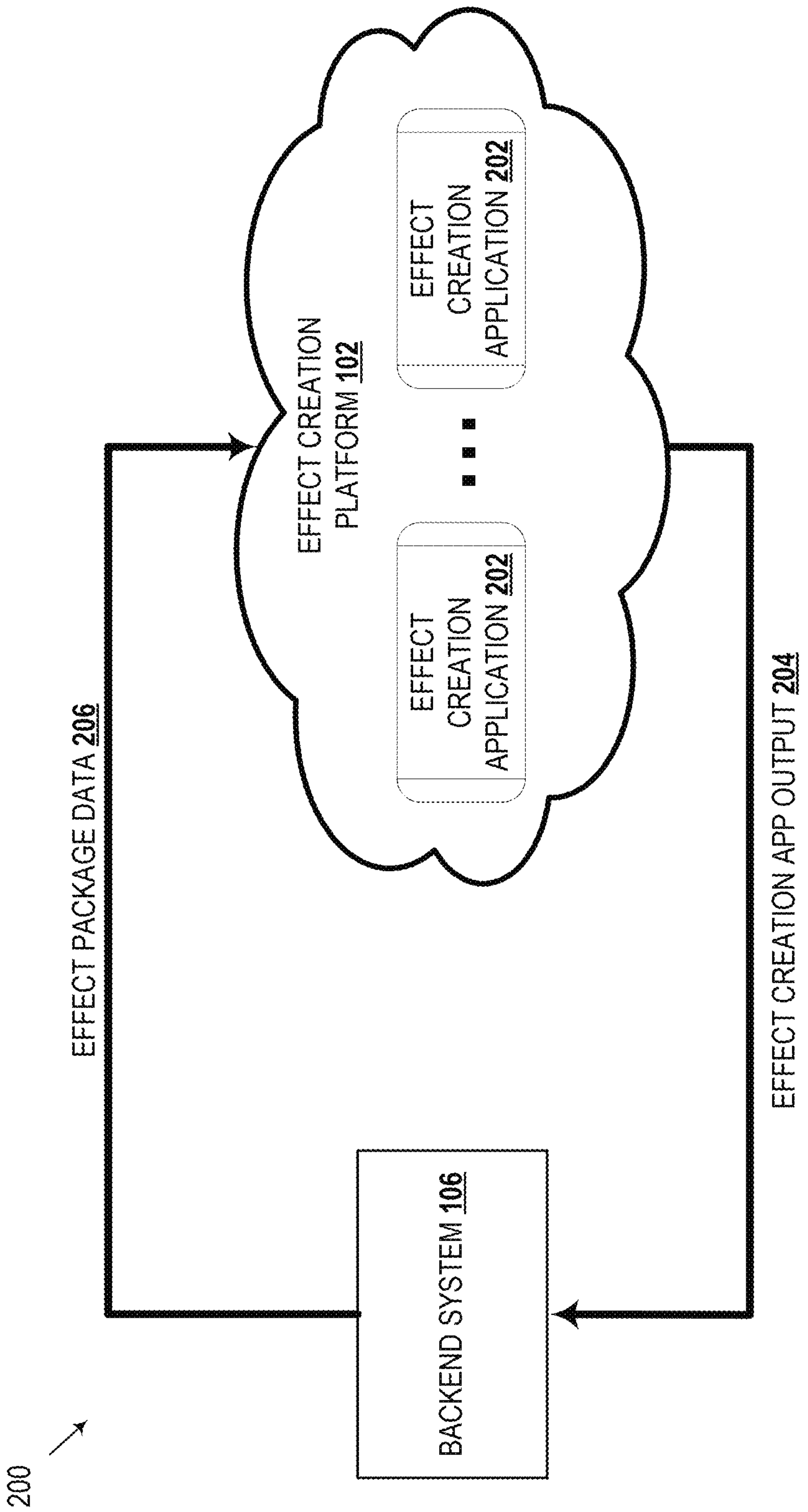
FIG. 2 shows an example pipeline 200 relating to the creation and usage of user-created effects, which can be implemented using the example system of FIG. 1.

FIG. 2 shows an example pipeline 200 relating to the creation and usage of user-created effects. The example pipeline 200 includes data flow between a backend system 106 and an effect creation platform 102. In the depicted example, the effect creation platform 102 is implemented using a set of servers controlling a plurality of instances of an effect creation application 202 that provides tools for creators to create effects. The provided tools can include, for example, pre-loaded effects that users can combine and modify to create their own effects. In some implementations, the effect creation platform 102 is implemented as a plurality of virtual machines implementing instances of the effect creation application 202.

Instances of the effect creation application 202 can be accessed by various user devices, including a reviewer system (such as the reviewer system 108 of FIG. 1) implementing a service application for automating the generation of effect-loaded videos for content review. After the creation of an effect, the effect creation application 202 outputs information 204 relating to the created effect to the backend system 106. In some implementations, the information output 204 includes effect package data that contains information describing the associated effect, such as metadata describing algorithms for performing the associated effect. When a user, including a reviewer, wants to apply the created effect, the backend system 106 transmits effect package data 206 associated with the created effect. The effect package data 206 is parsed by the effect creation application 202 to determine the appropriate algorithms that can be applied to load the created effect onto a selected video.

Figure 3:
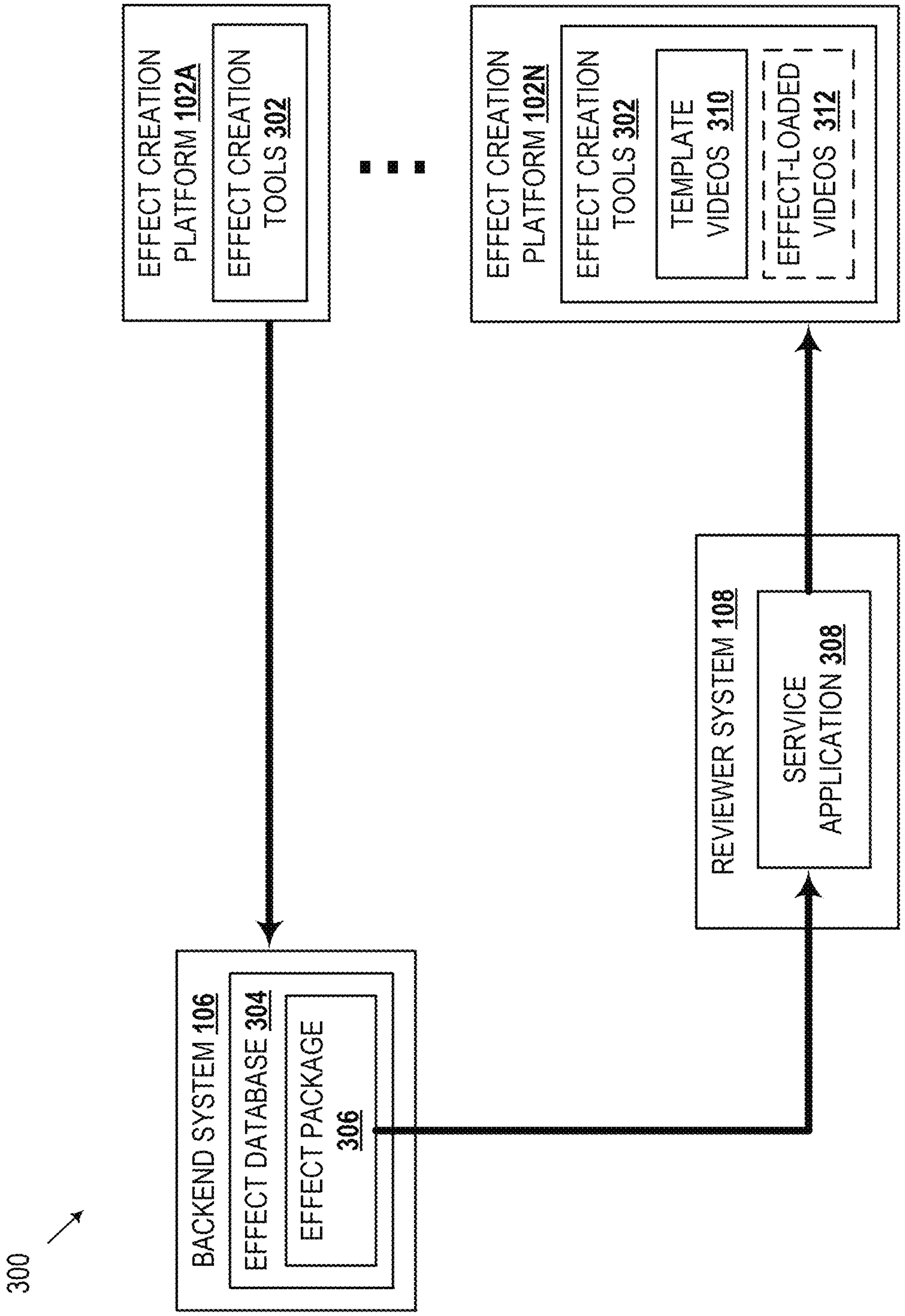
FIG. 3 shows an example pipeline for user-created effects, which can be implemented using the example system of FIG. 1.

FIG. 3 shows an example pipeline 300 for moderating user-created effects. The data flow starts with the creation of an effect by a user through an effect creation platform 102, which can be implemented using the effect creation application 202 as described in FIG. 2. As shown, the effect creation platform 102 can be implemented as a plurality of instances (e.g., 102A to 102N) for its users. The effect creation platform 102 includes effect creation tools 302 that can be utilized by users to create effects. For example, the effect creation tools 302 can include pre-loaded effects that users can select, combine, and/or modify (e.g., load custom digital objects) to create their own effects. Once an effect is created, the effect creation platform 102A transmits the associated information to the backend system 106, which stores the information in an effect database 304. The information can be stored in various ways. In the depicted example, the information is stored as an effect package 306 that includes metadata describing algorithms for applying the associated effect to a video.

Once a user-created effect is transmitted to the backend system 106 for review, a reviewer system 108 can be implemented to generate effect-loaded videos using the user-created effect for a human reviewer to review. In the depicted example, the reviewer system 108 includes a service application 308 that automates the creation of videos loaded with the user-created effect. The service application 308 retrieves the effect package 306 of the user-created effect (or its location) and sends it to an instance of the effect creation platform 102N. The effect creation tools 302, which were utilized in the creation of the effect, can also be utilized to load the effect onto a video. In the depicted example, the service application 308 sends the effect package data 306 to the effect creation platform 102N, and the effect creation tools 302 of the platform 102N are utilized to load the effect associated with the effect package 306 onto a set of template videos 310 to generate a set of effect-loaded videos 312. The set of effect-loaded videos 312 can then be sent to human reviewers for the final review. In some implementations, the set of template videos 310 are selected based on the metadata in the effect package data 306. For example, an effect package data 306 relating to an effect of placing a digital hat object onto a human head can result in the selection of a template video 310 that depicts a human head.

Figure 4:
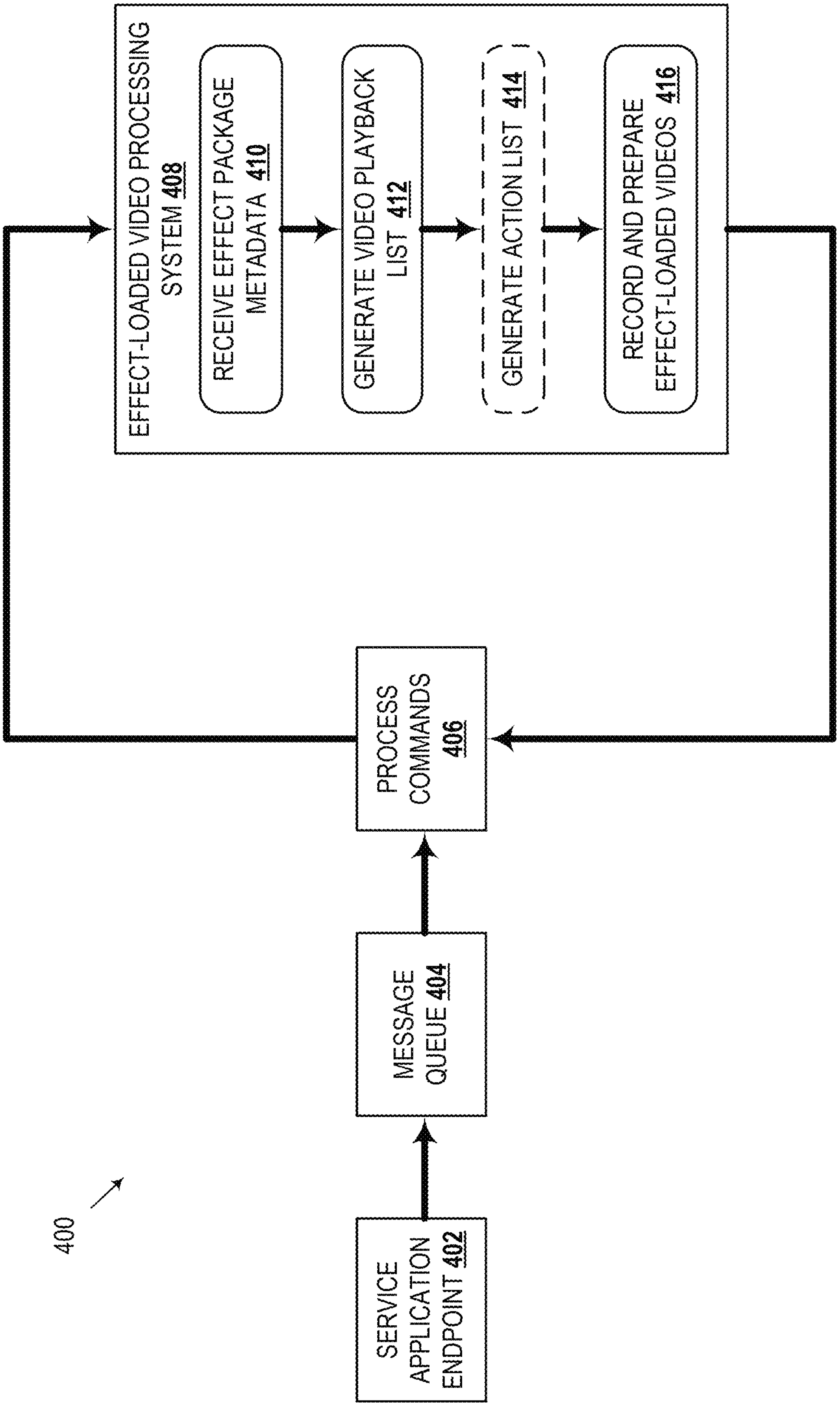
FIG. 4 shows an example pipeline for processing effect-loaded videos for use in a review process, which can be implemented using the example system of FIG. 1.

FIG. 4 shows an example pipeline 400 for processing effect-loaded videos for use in a review process. The depicted pipeline 400 starts with an endpoint 402 of the service application 308. In some implementations, the endpoint 402 is implemented as a remote procedure call program that communicates with an effect creation platform for generating the effect-loaded videos. The endpoint 402 utilizes a message queue 404 to send the effect package data of an effect for processing. The commands 406 for processing effect packages are performed in an ordered manner using an effect-loaded video processing system 408 implemented, for example, by an instance of the effect creation platform. For example, the effect-loaded video processing system 408 can be implemented, for example, using effect creation tools 302 provided by the effect creation platform 102 as illustrated in FIG. 3.

The effect-loaded video processing system 408 includes steps for loading an effect described by an effect package onto a set of selected videos. The process starts, at step 410, with receiving effect package metadata describing an effect that is to be reviewed. The effect package metadata can include various information. In some implementations, the effect package metadata can be parsed to describe a set of algorithms for performing the associated effect. For example, an effect for placing a digital object in a video can be described with a set of algorithms that includes a tracking algorithm for tracking an object in the video and an algorithm for adding a digital object in the video based on the tracked object. Any type of effect created by users can be replicated in such a manner. In some implementations, the set of algorithms includes a body part tracking algorithm that tracks a body part of a human body. Examples of such algorithms include head tracking algorithms, hand tracking algorithms, etc. In some implementations, the set of algorithms includes an algorithm for determining the occurrence of an event, such as a head nod, a hand wave, etc. An algorithm can also be configured to track multiples of a same object. For example, the algorithm can be configured to track every human head in a given video.

At step 412, a video playback list is generated based on the received effect package metadata. The video playback list can be generated in various ways. From the identified algorithm(s), a set of appropriate template videos can be selected. The template videos can be selected to accurately display the user-created effect. In some implementations, the video playback list includes a template video selected for each algorithm identified from the effect package metadata. Template videos can be selected in accordance with any predetermined criteria. In some implementations, the set of template videos includes one or more videos containing an object being tracked by a tracking algorithm described in the effect package metadata. In cases where multiples of a same object are tracked, a video depicting multiples of the object can be selected. In some implementations, a template video corresponding to multiple algorithms is selected.

The process can optionally include, at step 414, generating an action list. The action list can include input actions to be simulated on the template videos. Input actions can include various display gestures (e.g., touch, drag, swipe, etc.) and set actions (e.g., on click, on enter, on exit, etc.). For example, a user-created effect can include different reactions in response to display input actions or gestures. The action list can be applied to the template videos to accurately display these interactions for review by a human reviewer. In some implementations, the action list is generated by randomly generating input actions.

At step 416, the process includes recording and preparing effect-loaded videos for storage to a backend system. Recording of the effect-loaded videos can be performed in various ways. For example, the effect-loaded videos can be recorded using the effect creation tools of an effect creation application to apply the effects described in the effect package metadata onto a set of template videos. If the process includes generating an action list (step 414), the list of input actions can be simulated during the recording. After recording, the effect-loaded videos can then be outputted for review by a reviewer. Outputting the effect-loaded videos can include storing the effect-loaded videos at a shared memory location accessible by a reviewer system (e.g., through a service application) and a backend system. In some implementations, the effect-loaded videos are recorded and concatenated to generate a single video to be outputted, which can simplify the final review step in the review process.

Figure 5:
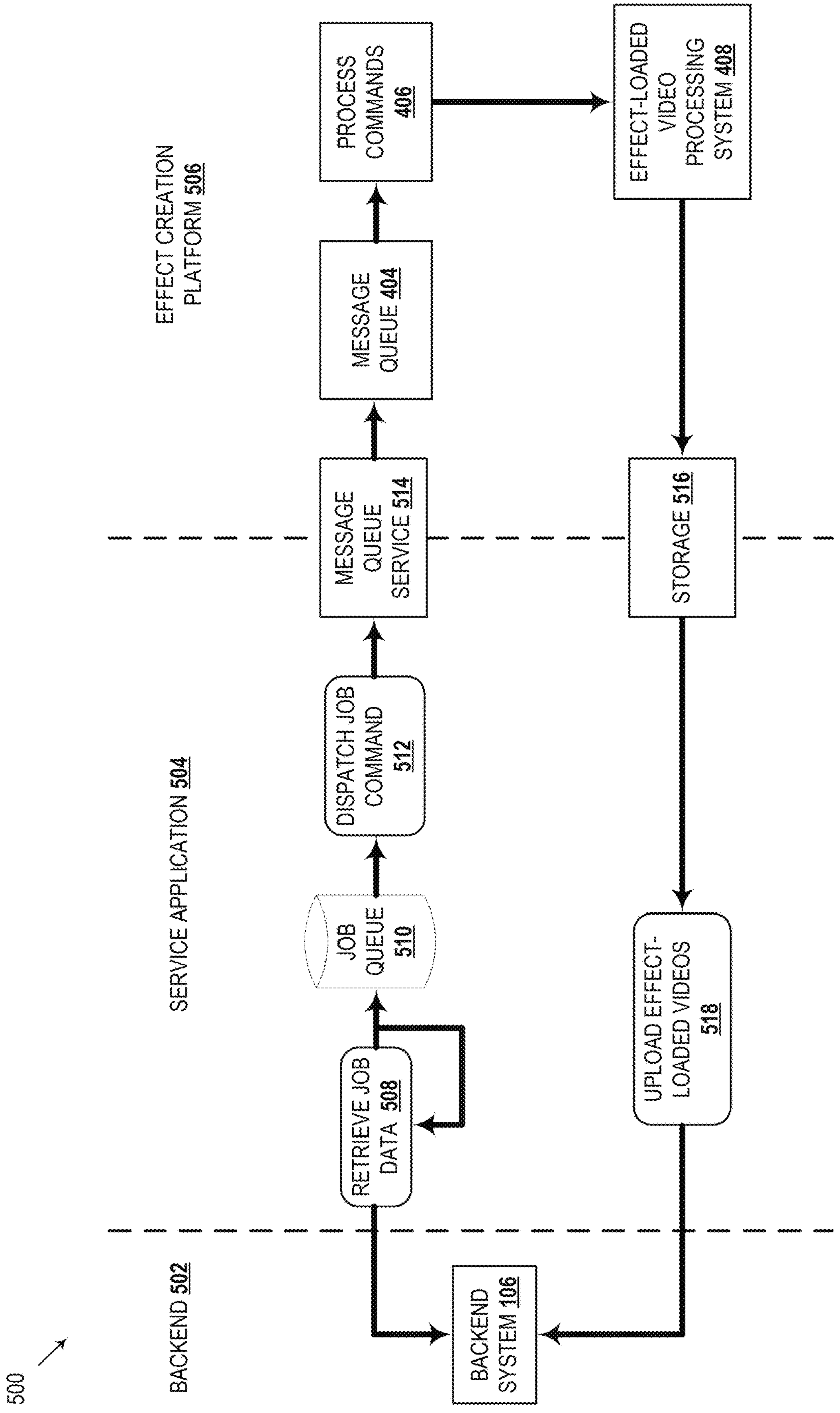
FIG. 5 shows an example communication pipeline for a review system, such as the example system of FIG. 1.

FIG. 5 shows an example communication pipeline 500 for a content review system. The depicted pipeline 500 illustrates the relationship between a backend 502, a service application 504, and an effect creation platform 506. As shown, the service application 504 communicates between the backend 502 and the effect creation platform 506. Upon submission of an effect to the backend 502 for review, a job is created. The service application 504 is implemented to retrieve job data 508 from the backend system 106. In the depicted example, the service application 504 attempts to retrieve job data 508 periodically, checking for and fetching new jobs at regular intervals. Once the job data is retrieved 508, it can be sent to a job queue 510. In some implementations, the job data is broken down into multiple jobs (subtasks). In some implementations, a new job is fetched when the job queue 510 is empty and there is no task in progress. From the job queue 510, the jobs are dispatched 512 in an ordered manner. In the depicted example, a message queue service 514 provides a communication interface for sending the jobs to a message queue 404 that retrieves the effect package data for processing. From there, the process 400 as described in FIG. 4 can be implemented to generate a set of effect-loaded videos using the effect creation platform 506.

The generated set of effect-loaded videos from the effect-loaded video processing system 406 of the effect creation platform 506 is outputted for review by a reviewer. In the depicted example, the set of effect-loaded videos is stored to a shared memory location 516 accessible by the service application 504 and the backend system 106. The service application 504 monitors (e.g., continuously, periodically, etc.) the shared memory location 516 for processed videos. Upon detection, the effect-loaded videos are uploaded 518 to the backend system 106, which can then be accessed by a human reviewer for review. In some implementations, the service application 504 includes a file watcher program that continuously monitors the shared memory location 516 for newly processed videos. Upon detection, the file watcher is notified and sends commands to upload the processed videos to the backend system 106.

Figure 6:
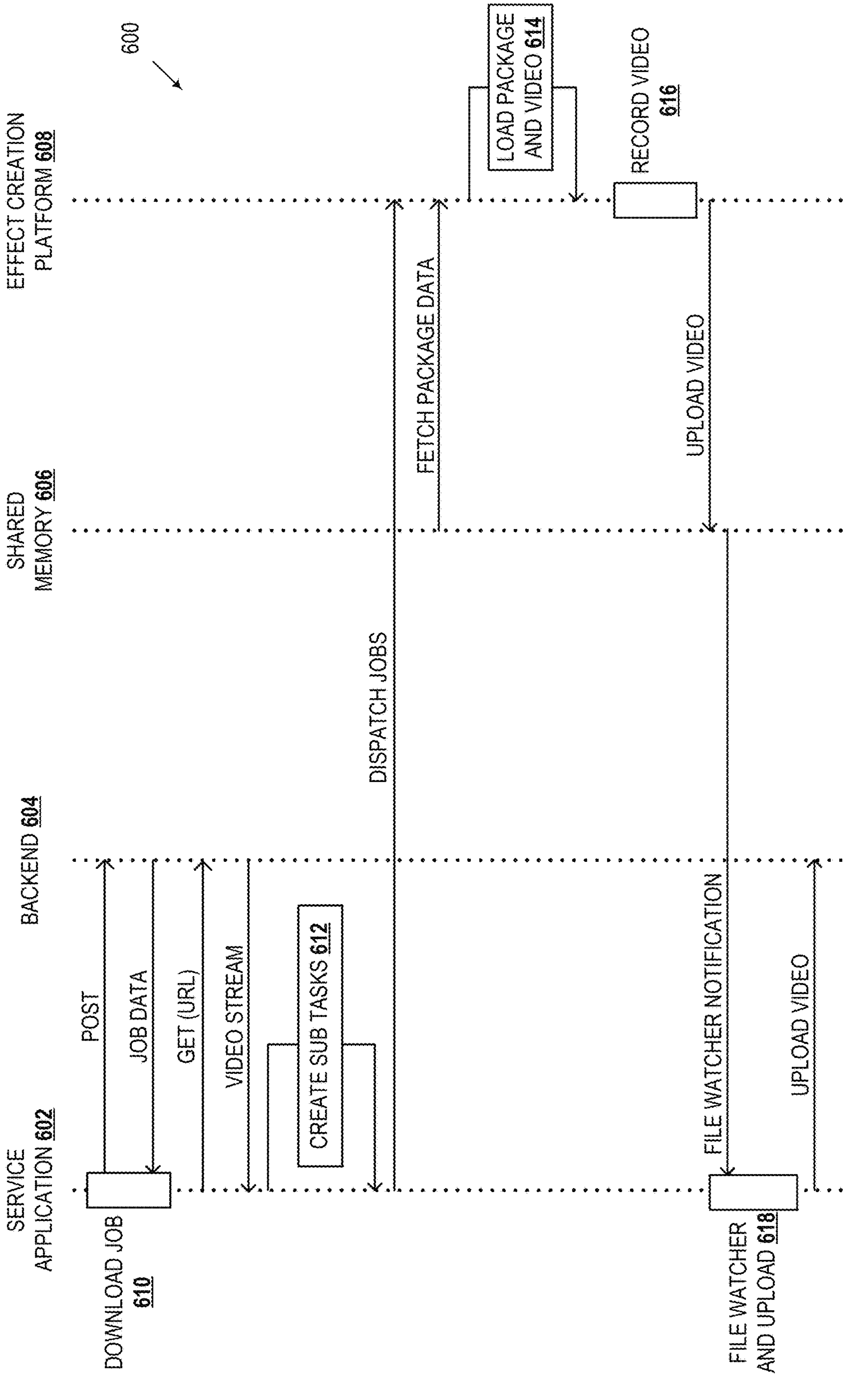
FIG. 6 shows an example sequence diagram illustrating interactions for a review system, such as the example system of FIG. 1.

FIG. 6 shows an example sequence diagram 600 illustrating interactions for a review system. The example diagram 600 depicts interactions between a service application 602, a backend 604, a shared memory location 606, and an effect creation platform 608. The sequence timing starts with the service application 602 performing a download job command 610, which sends a post command to the backend 604. Job data, which describes an effect, effect package data location, and/or other information for processing the effect (e.g, generating videos loaded with said effect for review), are retrieved from the backend.

In some implementations, the retrieved job data can be associated with one or more special input videos not found in the built-in template videos provided by the effect creation platform. In such cases, the service application 602 requests the associated address link (URL) of the special input video(s) from the backend 604 and retrieves the video stream of the special input video(s). Oftentimes, some or all of the special input videos can be updated dynamically and reused multiple times. In some implementations, a cache folder is added for storing the downloaded special input videos. In some implementations, the job data can be broken down into a plurality of jobs or sub-tasks. In the depicted example of FIG. 6, the service application creates sub-tasks 612 from the retrieved job data and dispatches the job(s) to the effect creation platform 608.

The effect creation platform 608 fetches effect package data from the shared memory location 606 based on the dispatched jobs from the service application 602. The effect creation platform 608 loads 614 the fetched effect package data and appropriate videos to be recorded with the effect described by the dispatched jobs. For example, template videos and/or special input videos can be loaded for recording. Then, the effect creation platform 608 records 616 the videos with the effect(s) described in the effect package data to generate effect-loaded videos ready for review by a human reviewer. In some implementations, the recording process includes concatenating a plurality of effect-loaded videos to generate a single video for output. The processes performed by the effect creation platform 608 can be implemented, for example, using effect creation tools 302 provided by an effect creation platform 102.

After the recording process 616, the effect creation platform 608 outputs the effect-loaded video(s) for review by uploading the video(s) to the shared memory location 606. The service application 602 implements a file watcher 618 that monitors the shared memory location 606 for videos ready for review. Upon receiving a notification that new video(s) are present in the shared memory location 606, the file watcher 618 sends commands to upload said video(s) to the backend 604, ready for a human reviewer to review.

Figure 7:
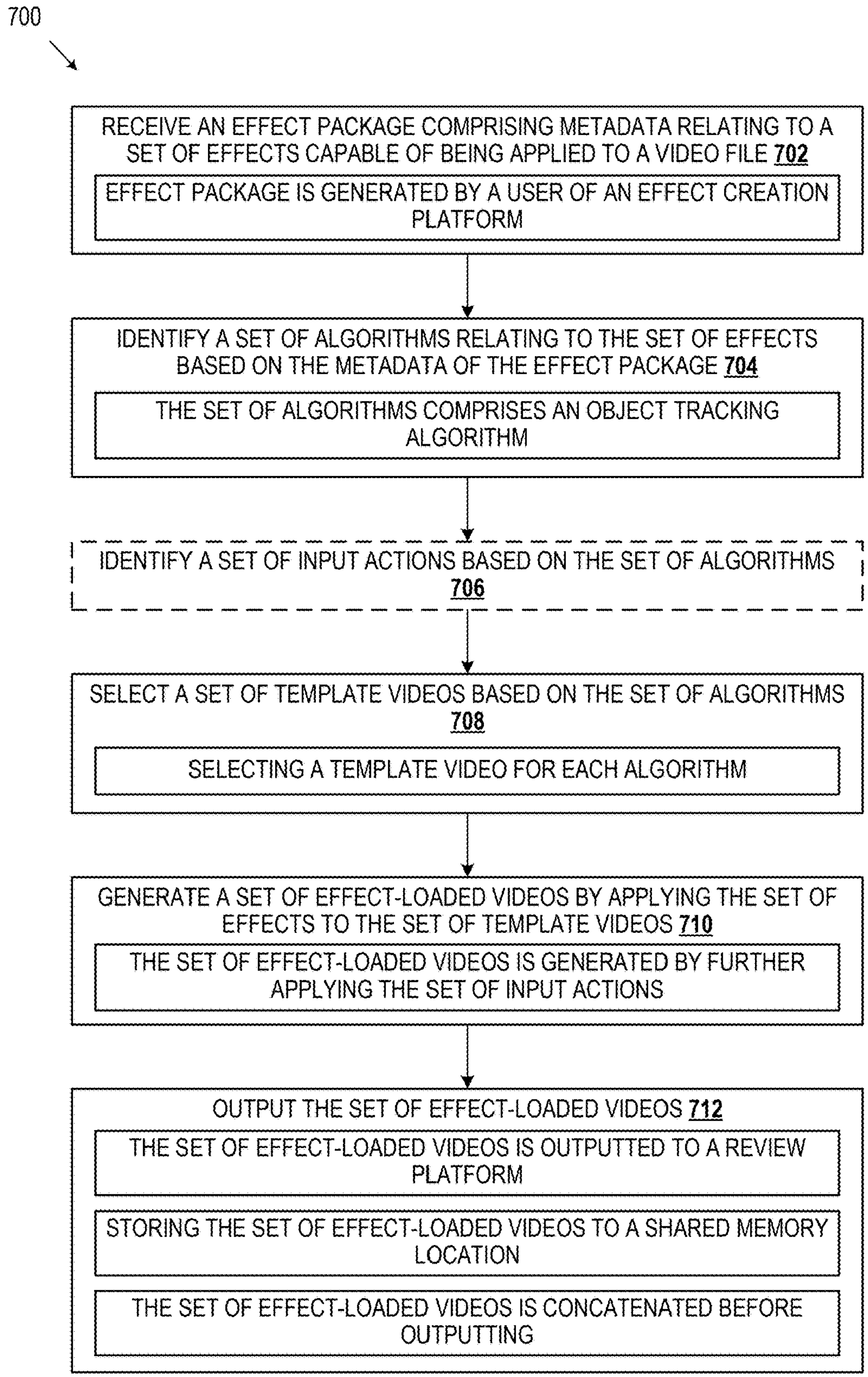
FIG. 7 shows a flow diagram of an example method for generating effect-loaded videos for a review system, which can be implemented using the example system of FIG. 1.

FIG. 7 shows a flow diagram of an example method 700 for generating effect-loaded videos for a content review system. At step 702, the method 700 includes receiving an effect package. The effect package can be received in various ways. In some implementations, the effect package is received from a backend system. For example, an effect package can be generated and stored to a backend system upon creation and submission of a user-created effect through an effect creation platform. The effect package can be formatted in various ways. In some implementations, the effect package includes metadata relating to a set of effects capable of being applied to a video file. The metadata can include information for recreating the user-created effects and applying them to a given video file. The set of effects can correspond to the user-created effects submitted for review.

At step 704, the method 700 includes identifying a set of algorithms relating to the set of effects. The algorithms can be identified based on the metadata of the effect package. The set of algorithms describes how the effects are applied and/or their interactions with certain augmented reality aspects. For example, the set of algorithms can include an object tracking algorithm. In some implementations, the set of algorithms includes a body part tracking algorithm that tracks a predetermined body part of a human body in a video. Examples of such algorithms include head tracking algorithms, hand tracking algorithms, etc. A tracking algorithm can also be configured to determine the occurrence of a predetermined event, such as a head nod, a hand wave, etc. In some implementations, the set of algorithms includes a tracking algorithm for tracking at least two of a same object. For example, the tracking algorithm can be configured to track every human head in a given video.

At step 706, the method 700 can optionally include identifying a set of input actions based on the set of algorithms. An input action can include various simulated display interactions, such as a touch gesture, a drag gesture, and a swipe gesture. In some implementations, the input action includes a set action, such as an on click event, an on enter event, an on exit event, etc. Simulating input actions can provide visualization of certain effects, providing more accurate effect-loaded videos for a reviewer to review. For example, an effect can be created to display a digital object overlaid on a video at a location where a touch gesture is registered. By simulating a touch gesture and recording a video with the effect, the effect-loaded video can show the interactive component of the effect for a human reviewer to review.

At step 708, the method 700 includes selecting a set of template videos based on the set of algorithms. Selecting the set of template videos can be performed in various ways. In some implementations, the effect creation platform provides pre-loaded template videos from which to select. Template videos can be selected in accordance with any predetermined criteria. For example, in cases where the set of algorithms includes an object tracking algorithm, the set of template videos can include one or more videos containing the object being tracked. In cases where multiples of a same object are tracked, a video depicting multiple entities can be selected (e.g., a video showing two human models can be selected to correspond to an algorithm that tracks multiples of a same body part). In some implementations, a template video is selected for each algorithm of the set of algorithms. The template videos can also be configured to correspond to multiple different algorithm categories. For example, a video depicting a human model and a cat model can correspond to both an algorithm that tracks a human body part and an algorithm that tracks a cat. In some implementations, the effect package corresponds to one or more special input videos that are not provided by the effect creation platform. In such cases, the method 700 can include receiving the one or more special input videos from an appropriate entity. For example, a backend system can provide the location of the special input videos to the system performing the method 700 described herein.

At step 710, the method 700 includes generating a set of effect-loaded videos. The set of effect-loaded videos can be generated in various ways. In some implementations, the set of effect-loaded videos is generated by applying the set of effects to the set of template videos. The effect-loaded videos can be generated using an effect creation platform that provides pre-loaded template videos. The same effect creation platform that created the effect(s) to be loaded can be utilized to generate the effect-loaded videos. For example, the effect creation platform can provide various pre-loaded effects that a user can combine and modify to create their own effect. These pre-loaded effects can be associated with metadata that describes algorithms performed by the effect. Once created, the metadata (contained in the effect package data) can be used by the same effect creation platform to recreate the user-created effect, providing a more accurate display of the user-created effect. In some implementations, the set of effect-loaded videos is generated by further applying the set of input actions to the set of template videos.

At step 712, the method 700 includes outputting the set of effect-loaded videos. The set of effect-loaded videos can be outputted in various ways. In some implementations, the set of effect-loaded videos is outputted to a review platform (such as the system described in FIG. 1) from which a reviewer can review the set of effect-loaded videos. In some implementations, outputting the set of effect-loaded videos includes storing the set of effect-loaded videos to a shared memory location accessible by various entities in a review system. For example, the set of effect-loaded videos can be uploaded to a shared memory location accessible by a backend system from which reviewers can access to review.

In some implementations, the set of effect-loaded videos is concatenated, and the concatenated video is outputted.

Implementations for automating the creation of effect-loaded videos for review can be performed in various ways in addition to the methodology described in FIG. 7. By implementing an automated service application that can autonomously collect user-created effects and process appropriate videos using said effects for a human reviewer to review, the review pipeline can be significantly streamlined for efficiency. In addition to time and cost efficiency, the automation provides higher-quality replication of effects that can mitigate or prevent potential technical and human errors, providing a more consistent and reliable review methodology compared to current techniques.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
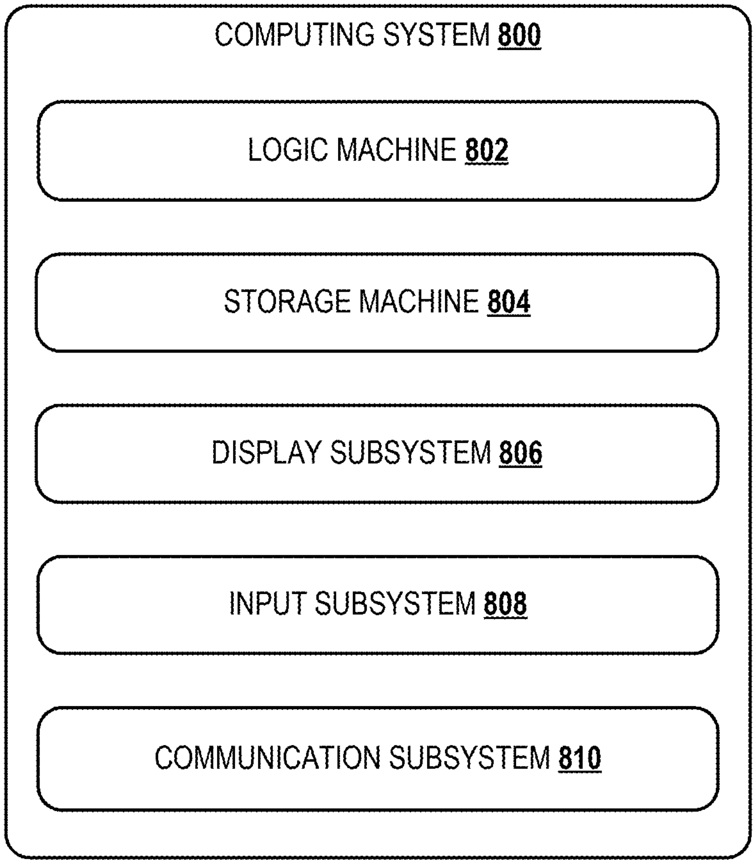
FIG. 8 shows a schematic view of an example computing device in which the processes described herein may be enacted.

FIG. 8 schematically shows a non-limiting embodiment of a computing system 800 that can enact one or more of the methods and processes described above. Computing system 800 is shown in simplified form. Computing system 800 may embody the computing system 1 described above and illustrated in FIG. 1. Components of computing system 800 may be included in one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 800 includes a logic processor 802 volatile memory 804, and a non-volatile storage device 806. Computing system 800 may optionally include a display subsystem 808, input subsystem 810, communication subsystem 812, and/or other components not shown in FIG. 8.

Logic processor 802 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the logic processor 802 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 806 includes one or more physical devices configured to hold instructions executable by the logic processors to implement the methods and processes described herein. When such methods and processes are implemented, the state of non-volatile storage device 806 may be transformed—e.g., to hold different data.

Non-volatile storage device 806 may include physical devices that are removable and/or built in. Non-volatile storage device 806 may include optical memory, semiconductor memory, and/or magnetic memory, or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 typically implemented in software by a processor to perform a particular function using portions of volatile memory, which function involves transformative processing that specially configures the processor to perform the function. Thus, a module, program, or engine may be instantiated via logic processor 802 executing instructions held by non-volatile storage device 806, using portions of volatile memory 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 808 may be used to present a visual representation of data held by non-volatile storage device 806. The visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, camera, or microphone.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 800 to send and/or receive messages to and/or from other devices via a network such as the Internet.

The following paragraphs provide additional description of the subject matter of the present disclosure. One aspect provides a computer system for generating effect-loaded videos, the computer system comprising: processing circuitry and memory storing instructions that, when executed, causes the processing circuitry to: receive an effect package comprising metadata relating to a set of effects capable of being applied to a video file; identify a set of algorithms relating to the set of effects based on the metadata of the effect package; select a set of template videos based on the set of algorithms; generate a set of effect-loaded videos by applying the set of effects to the set of template videos; and output the set of effect-loaded videos. In this aspect, additionally or alternatively, the set of effect-loaded videos is outputted to a content review platform from which a content reviewer can review the set of effect-loaded videos. In this aspect, additionally or alternatively, outputting the set of effect-loaded videos comprises storing the set of effect-loaded videos to a shared memory location from which a backend system can access. In this aspect, additionally or alternatively, selecting the set of template videos comprises selecting a template video for each algorithm of the set of algorithms. In this aspect, additionally or alternatively, the instructions, when executed, further cause the processing circuitry to identify a set of input actions based on the set of algorithms, wherein each input action comprises a simulated display interaction, and wherein the set of effect-loaded videos is generated by applying the set of effects and the set of input actions to the set of template videos. In this aspect, additionally or alternatively, the set of input actions comprises one or more of a touch gesture, a drag gesture, or a swipe gesture. In this aspect, additionally or alternatively, the set of algorithms comprises an object tracking algorithm. In this aspect, additionally or alternatively, the object tracking algorithm comprises a body part tracking algorithm, and wherein the set of template videos comprises a template video containing a human model showing a body part relating to the body part tracking algorithm. In this aspect, additionally or alternatively, the set of algorithms comprises a tracking algorithm for at least two of a same object. In this aspect, additionally or alternatively, the instructions, when executed, further cause the processing circuitry to concatenate the set of effect-loaded videos to generate a concatenated effect-loaded video, wherein outputting the set of effect-loaded videos comprises outputting the concatenated effect-loaded video.

Another aspect provides a method for generating effect-loaded videos, the method comprising: receiving an effect package comprising metadata relating to a set of effects capable of being applied to a video file; identifying a set of algorithms relating to the set of effects based on the metadata of the effect package; selecting a set of template videos based on the set of algorithms; generating a set of effect-loaded videos by applying the set of effects to the set of template videos; and outputting the set of effect-loaded videos. In this aspect, additionally or alternatively, the set of effect-loaded videos is outputted to a content review platform from which a content reviewer can review the set of effect-loaded videos. In this aspect, additionally or alternatively, outputting the set of effect-loaded videos comprises storing the set of effect-loaded videos to a shared memory location from which a backend system can access. In this aspect, additionally or alternatively, selecting the set of template videos comprises selecting a template video for each algorithm of the set of algorithms. In this aspect, additionally or alternatively, the method further comprises identifying a set of input actions based on the set of algorithms, wherein each input action comprises a simulated display interaction, and wherein the set of effect-loaded videos is generated by applying the set of effects and the set of input actions to the set of template videos. In this aspect, additionally or alternatively, the set of algorithms comprises an object tracking algorithm. In this aspect, additionally or alternatively, the object tracking algorithm comprises a body part tracking algorithm, and wherein the set of template videos comprises a template video containing a human model showing a body part relating to the body part tracking algorithm. In this aspect, additionally or alternatively, the set of algorithms comprises a tracking algorithm for at least two of a same object. In this aspect, additionally or alternatively, the method further comprises concatenating the set of effect-loaded videos to generate a concatenated effect-loaded video, wherein outputting the set of effect-loaded videos comprises outputting the concatenated effect-loaded video.

Another aspect provides a method for automating a content review pipeline, the method comprising: receiving job data from a backend system, wherein the job data describes an effect package comprising metadata relating to a set of effects capable of being applied to a video file; dispatching a set of jobs based on the received job data to an effect creation platform; monitoring a shared memory location to which the effect creation platform can write; and upon detecting a set of effect-loaded videos related to the set of jobs in the shared memory location, uploading the set of effect-loaded videos to the backend system, wherein the set of effect-loaded videos are generated by applying the set of effects to a set of template videos.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system for generating effect-loaded videos, the computer system comprising:

processing circuitry and memory storing instructions that, when executed, causes the processing circuitry to:

receive, from a backend system, an effect package comprising metadata relating to a set of effects capable of being applied to a video file;

parse the metadata relating to the set of effects to identify a set of algorithms relating to the set of effects;

load a set of template videos based on the set of algorithms relating to the set of effects;

generate a set of effect-loaded videos by applying the set of effects to the set of template videos; and output the set of effect-loaded videos to the backend system for content review.

2. The computer system of claim 1, wherein the set of effect-loaded videos is outputted to a content review platform from which a content reviewer can review the set of effect-loaded videos.

3. The computer system of claim 1, wherein outputting the set of effect-loaded videos comprises storing the set of effect-loaded videos to a shared memory location from which the backend system can access.

4. The computer system of claim 1, wherein the set of template videos comprises a template video for each algorithm of the set of algorithms.

5. The computer system of claim 1, wherein the instructions, when executed, further cause the processing circuitry to:

identify a set of input actions based on the set of algorithms, wherein each input action comprises a simulated display interaction, and wherein the set of effect-loaded videos is generated by applying the set of effects and the set of input actions to the set of template videos.

6. The computer system of claim 5, wherein the set of input actions comprises one or more of a touch gesture, a drag gesture, or a swipe gesture.

7. The computer system of claim 1, wherein the set of algorithms comprises an object tracking algorithm.

8. The computer system of claim 7, wherein the object tracking algorithm comprises a body part tracking algorithm, and wherein the set of template videos comprises a template video containing a human model showing a body part relating to the body part tracking algorithm.

9. The computer system of claim 1, wherein the set of algorithms comprises a tracking algorithm for at least two of a same object.

10. The computer system of claim 1, wherein the instructions, when executed, further cause the processing circuitry to:

concatenate the set of effect-loaded videos to generate a concatenated effect-loaded video, wherein outputting the set of effect-loaded videos comprises outputting the concatenated effect-loaded video.

11. A method for generating effect-loaded videos, the method comprising:

receiving, at a computer system and from a backend system, an effect package comprising metadata relating to a set of effects capable of being applied to a video file;

parsing the metadata relating to the set of effects to identify a set of algorithms relating to the set of effects;

loading a set of template videos based on the set of algorithms relating to the set of effects;

generating a set of effect-loaded videos by applying the set of effects to the set of template videos; and outputting the set of effect-loaded videos to the backend system for content review.

12. The method of claim 11, wherein the set of effect-loaded videos is outputted to a content review platform from which a content reviewer can review the set of effect-loaded videos.

13. The method of claim 11, wherein outputting the set of effect-loaded videos comprises storing the set of effect-loaded videos to a shared memory location from which the backend system can access.

14. The method of claim 11, wherein the set of template videos comprises a template video for each algorithm of the set of algorithms.

15. The method of claim 11, further comprising identifying a set of input actions based on the set of algorithms, wherein each input action comprises a simulated display interaction, and wherein the set of effect-loaded videos is generated by applying the set of effects and the set of input actions to the set of template videos.

16. The method of claim 11, wherein the set of algorithms comprises an object tracking algorithm.

17. The method of claim 16, wherein the object tracking algorithm comprises a body part tracking algorithm, and wherein the set of template videos comprises a template video containing a human model showing a body part relating to the body part tracking algorithm.

18. The method of claim 11, wherein the set of algorithms comprises a tracking algorithm for at least two of a same object.

19. The method of claim 11, further comprising concatenating the set of effect-loaded videos to generate a concatenated effect-loaded video, wherein outputting the set of effect-loaded videos comprises outputting the concatenated effect-loaded video.

20. A method for automating a content review pipeline, the method comprising:

receiving, by a computer system, job data from a backend system, wherein the job data describes an effect package comprising metadata relating to a set of effects capable of being applied to a video file;

dispatching, by the computer system, a set of jobs based on the received job data to an effect creation platform;

monitoring, by a file watcher program of the computer system, a shared memory location to which the effect creation platform can write; and upon detecting a set of effect-loaded videos related to the set of jobs in the shared memory location, uploading, by the computer system, the set of effect-loaded videos to the backend system, wherein the set of effect-loaded videos are generated by applying the set of effects to a set of template videos.

* * * * *